United States Patent
Futschek

(10) Patent No.: US 7,084,527 B2
(45) Date of Patent: Aug. 1, 2006

(54) ELECTRIC SUSPENDED CONVEYOR WITH CONTACTLESS ENERGY TRANSMISSION

(75) Inventor: Norbert Futschek, Potsdam (DE)

(73) Assignee: LJU Industrieelektronik GmbH (DE)

( * ) Notice: Subject to any disclaimer, the term of this patent is extended or adjusted under 35 U.S.C. 154(b) by 429 days.

(21) Appl. No.: 10/239,268

(22) PCT Filed: Feb. 12, 2001

(86) PCT No.: PCT/DE01/00574

§ 371 (c)(1),
(2), (4) Date: Jan. 21, 2003

(87) PCT Pub. No.: WO01/71882

PCT Pub. Date: Sep. 27, 2001

(65) Prior Publication Data

US 2003/0146062 A1    Aug. 7, 2003

(30) Foreign Application Priority Data

Mar. 22, 2000  (DE) .............................. 100 14 954

(51) Int. Cl.
*H01F 38/00* (2006.01)

(52) U.S. Cl. ....................... 307/104; 191/10

(58) Field of Classification Search ............. 307/89, 307/104; 191/10; D12/52
See application file for complete search history.

(56) References Cited

U.S. PATENT DOCUMENTS

| | | | |
|---|---|---|---|
| 5,293,308 A * | 3/1994 | Boys et al. | 363/37 |
| 5,619,078 A | 4/1997 | Boys et al. | |
| 5,831,841 A * | 11/1998 | Nishino | 363/37 |
| 5,938,151 A * | 8/1999 | Takasan et al. | 246/194 |
| 6,089,512 A * | 7/2000 | Ansorge et al. | 246/194 |
| 6,265,791 B1 * | 7/2001 | Eberl et al. | 307/104 |
| 6,483,202 B1 * | 11/2002 | Boys | 307/17 |
| 6,515,878 B1 * | 2/2003 | Meins et al. | 363/37 |

FOREIGN PATENT DOCUMENTS

| | | |
|---|---|---|
| DE | 44 46 779 | 12/1994 |
| EP | 818 868 | 1/1998 |
| WO | WO 98 57 413 | 12/1998 |
| WO | WO009857413 A1 * | 12/1998 |

\* cited by examiner

*Primary Examiner*—Brian Sircus
*Assistant Examiner*—Andrew Deschere
(74) *Attorney, Agent, or Firm*—Wood, Phillips, Katz, Clark & Mortimer

(57) ABSTRACT

In an electric telpher or similar conveyor system comprising movable transfer units, power is transmitted to consumers having differing input power requirements in that the slide rail (1) is also used as return conductor of the feeder (4) in the primary circuit and in that the current collector (6) of the secondary circuit comprises two separate and differently rated windings ($N_{o1}$, $N_{o2}$) to provide two separate supply voltages ($U_{o1}$, $U_{o2}$) with different load capacities that are geared to the differing power needs of the consumers via electronic collector circuits (AE1, AE2).

11 Claims, 5 Drawing Sheets

ELECTRIC SUSPENDED CONVEYOR WITH CONTACTLESS ENERGY TRANSMISSION

FIELD OF THE INVENTION

The invention relates to an electric telpher with non-contact power transmission from a feeder and return conductor conducted along a slide rail and connected to a higher-frequency AC power supply via a current collector configured as a U-shaped ferrite core with windings that encompasses the supply line to the control and power circuits of a transfer unit that can travel on the slide rail.

BACKGROUND OF THE INVENTION

Non-contact inductive transmission of electrical power to rail-guided transfer units equipped with electric consumers has been known for a long time. For example, DE 44 46 779 describes an arrangement for non-contact inductive power transmission to electrically powered transfer units that are moved on a closed track. In this arrangement, a feeder fed by a higher-frequency AC power supply is kept at a spacing from the slide rail and encompassed by the respective current collector that is mounted to the respective transfer unit and connected to the drive motor and the control circuit. The current collector consists of a U-shaped ferrite core with a winding around its limbs. Transmission of electrical power from the primary feeder to the secondary windings is based on the transformer principle, and the various consumers on the transfer unit are supplied a voltage level in accordance with their power needs. As the control circuit of the transfer unit, however, requires a considerably lower voltage (24V) than the power circuit, an enormous switching effort is required to supply the 24V DC from the 560V DC voltage provided by the current collector. A similar effort is required for the return conductor of the primary power supply that in DE 44 46 779 is formed by the sidewalls of a casing that almost completely encompasses the current collector.

SUMMARY OF THE INVENTION

It is therefore an object of this invention to disclose an electric telpher with non-contact electrical power transmission that can be efficiently produced as regards current transfer from the primary supply to the various consumers of the transfer units.

The inventive idea is to use the aluminum slide rail for the transfer units of the telpher as return conductor. When combining this characteristic with an arrangement of two separate windings on the U-shaped ferrite core (current collector) to be able to provide two independent direct currents of different voltages and load capacities for the control and power circuits and thereby considerably simplify the switching effort required for providing the lower voltage, overall expenditure of supplying power to the consumers of the transportable units is considerably reduced.

The inventive power supply to the transfer units is, of course, not limited to suspended or telpher systems but may also be used in a similarly advantageous way with other conveying equipment in which a transfer unit is moved along a rail and that operates on a non-contact power supply. This is a more effortless way to make use of the known advantages of non-contact power transmission, such as high operational reliability even under difficult operating conditions, minimum maintenance and wear, low noise, high conveying speed, and high efficiency.

The subclaims and the description of an exemplary embodiment below reveal other important characteristics of the invention, for example regarding the supply of a stabilized medium-frequency current to the primary circuit, positioning and attachment of the feeder in a specially designed bracket that can be attached to the slide rail, the electrical configuration of the current collectors, or the design of junction points of the telpher.

DETAILED DESCRIPTION OF THE DRAWINGS

An embodiment of the invention is explained in greater detail below with reference to the figures. Wherein.

DETAILED DESCRIPTION OF THE INVENTION

Figure 1:
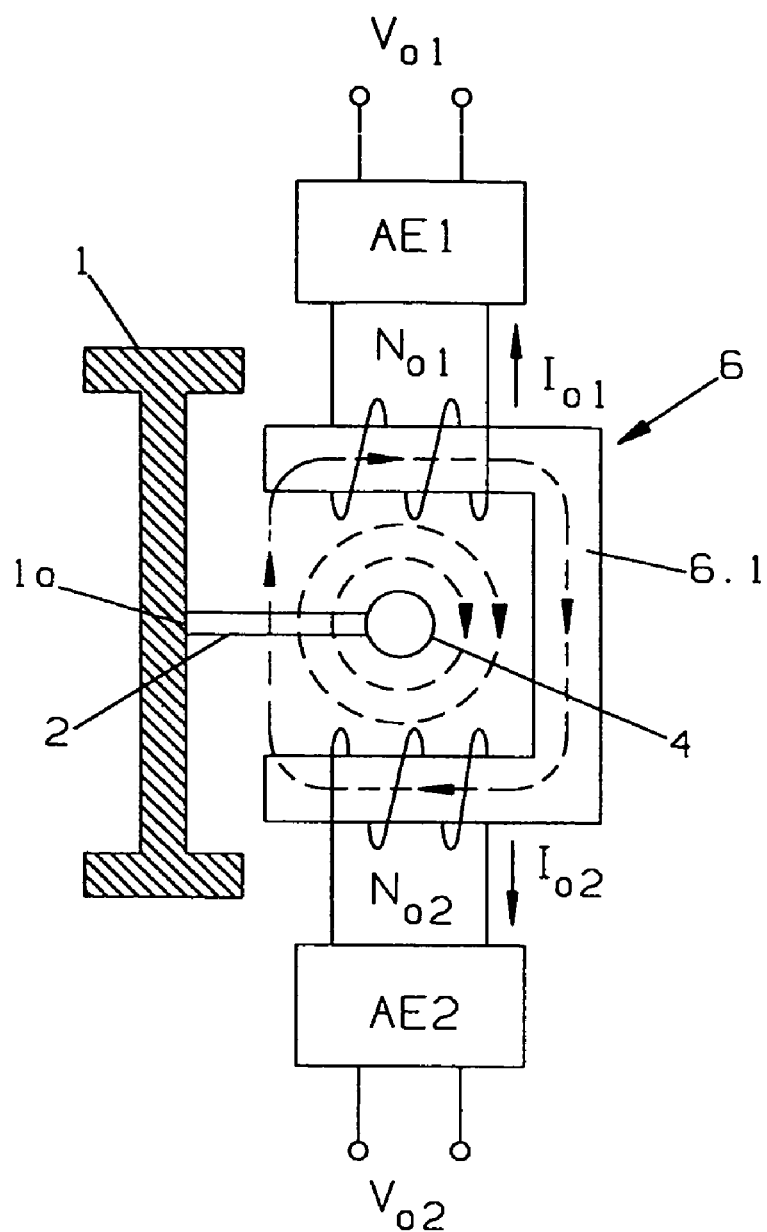
FIG. 1 is a schematic view of an arrangement for non-contact transmission of electrical power to a transfer unit that can be moved along the slide rail of an electric telpher system.
Figure 2:
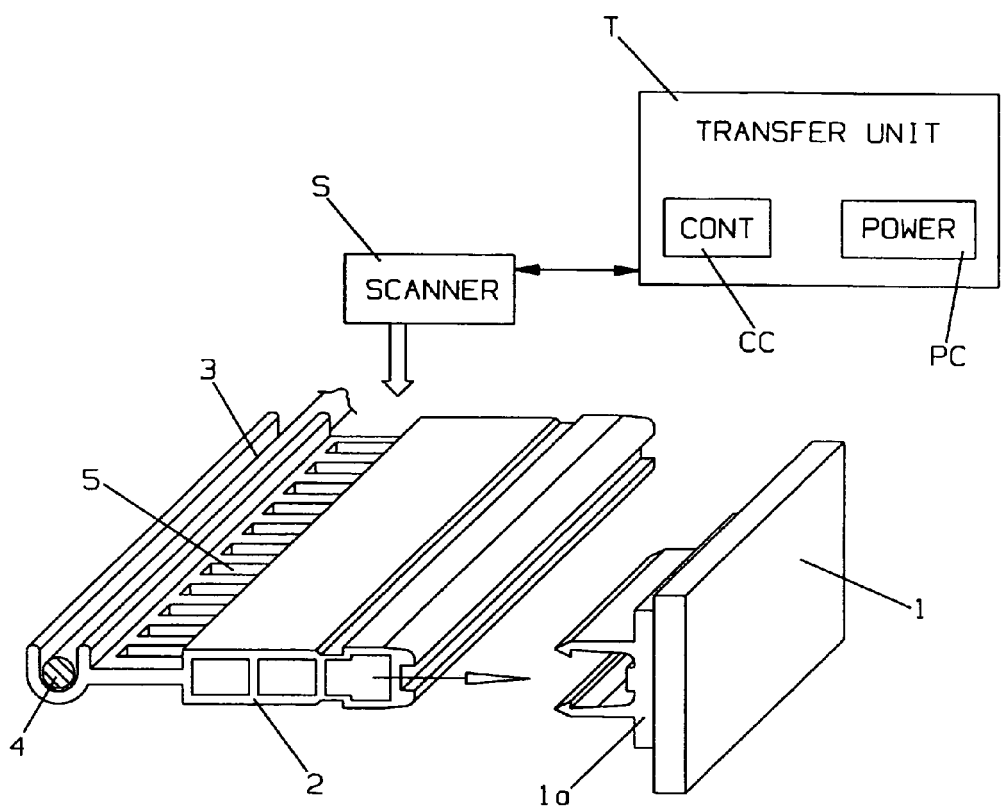
FIG. 2 is a sectional, partially perspective view of a feeder bracket that can be locked into the slide rail of an electric telpher system and is mechanically coded for position detection.

The arrangement for non-contact power transmission as shown in FIGS. 1 and 2 comprises an aluminum slide rail 1 for guiding a transfer unit T for carrying and transporting loads that is equipped with a control circuit CC and a power circuit PC. A feeder bracket 2 made of a non-conducting, preferably synthetic material is mounted to the slide rail 1, said feeder bracket comprising a holding groove 3 in its free end placed at a spacing to said slide rail 1 to receive a feeder 4 in the form of a high-frequency litz wire. As FIG. 2 shows, this feeder bracket 2 further comprises a mechanical coding in the form of a slotted code rail 5 that is used by a scanner S mounted to the transfer unit T to ensure absolute position detection. Where the slide rail 1 has a bend, the feeder bracket 2 is made of short segments (not shown) which can be locked into compact holders 1a attached to one longitudinal side of the slide rail 1. The feeder bracket 2 protrudes into a current collector 6 that is configured as a U-shaped ferrite core 6.1 with one winding $N_{01}$ or $N_{02}$, respectively, on each of its limbs. The windings $N_{01}$ and $N_{02}$ are each connected to an electronic collector circuit AE1 or AE2, respectively, and these two circuits provide two separate supply voltages $V_{01}$ and $V_{02}$ to supply the transfer unit with direct current ($I_{01}$; $I_{02}$). The windings $N_{01}$ and $N_{02}$ have different ratings so that the voltages $V_{01}$ and $V_{02}$ are different in size and load capacity, one suitable for the control circuit CC and one suitable for the power circuit PC of the respective transfer unit T. Thus wiring and switching requirements for the power electronics are rather low. The low voltage may also be used to feed small consumers. The feeder 4 is located inside the U-shaped ferrite core 6.1 of current collector 6 at a minimum depth of 40% of the overall depth of the core 6.1 to ensure the creation of a magnetic flux in the ferrite core and provide an adequate magnetomotive force ($N_{01} \cdot I_{01}$, $N_{02} \cdot I_{02}$).

Figure 3:
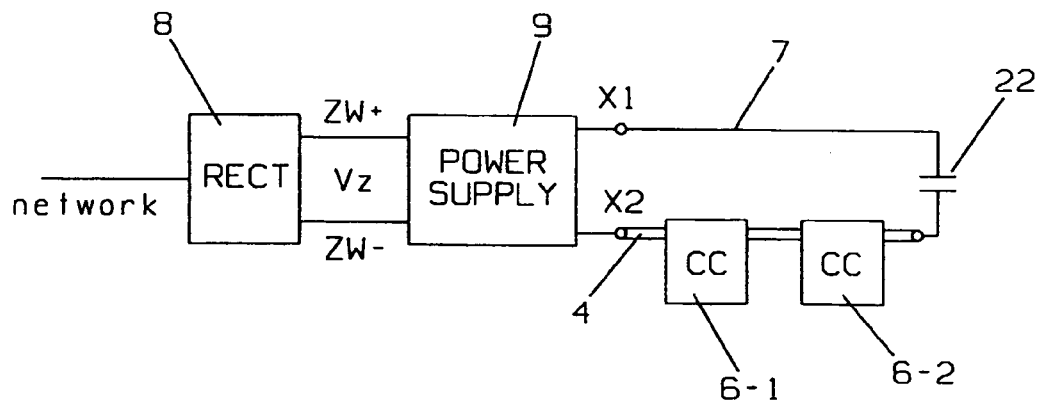
FIG. 3 shows a switching arrangement for feeding power into the primary circuit of an arrangement for non-contact power transmission.
Figure 4:
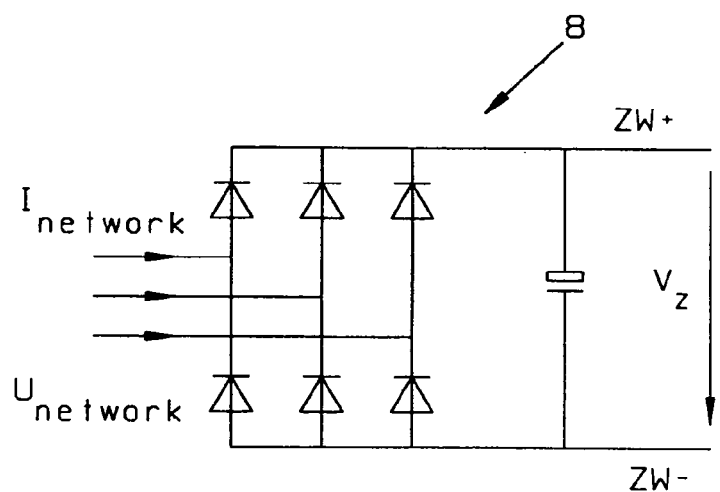
FIG. 4 shows a circuit wiring diagram of the bridge rectifier to be provided according to FIG. 3.
Figure 5:
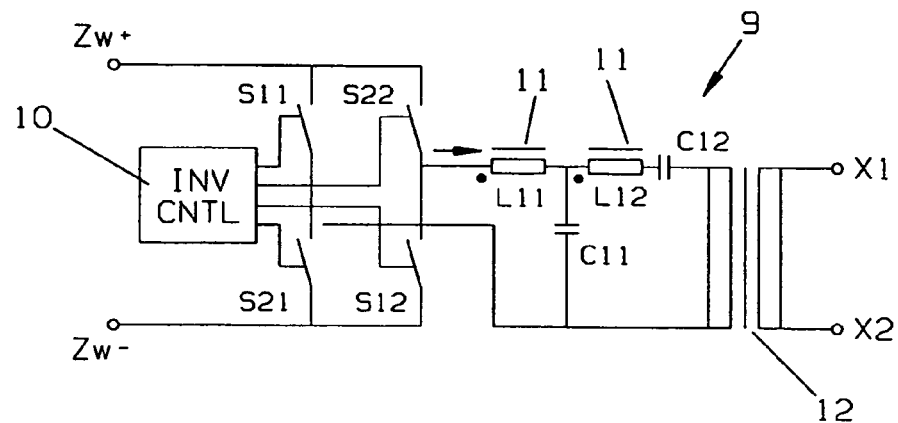
FIG. 5 shows a circuit wiring diagram of the stabilized power supply for power feeding as shown in FIG. 3.

As shown in FIG. 3, the primary circuit of the arrangement consisting of the feeder 4 and a return conductor 7 is supplied with power from a three-phase low-voltage system via a six-pulse bridge rectifier 8 that provides a link voltage $V_z$ across conductors ZW+ and ZW− to a power supply 9. A circuit wiring diagram of the bridge rectifier 8 is shown in FIG. 4 and of the power supply 9 is shown in FIG. 5. The power supply 9 operates as a stabilized power supply including a PWM rectifier inverter control 10 that drives switches S11, S21, S22 and S12 connected to two LC components 11, comprising inductors L11 and L12 and capacitors C11 and C12 and an output transformer 12 is provided downstream from the bridge rectifier 8 so that a constant medium-frequency current is supplied at terminals X1 and X2. The PWM rectifier inverter 10 determines the output frequency of the constant current while the two LC components 11 are responsible for the quality of the sinusoidal wave shape of the constant current and for limiting the noise spectrum along the feeder 4.

Figure 6:
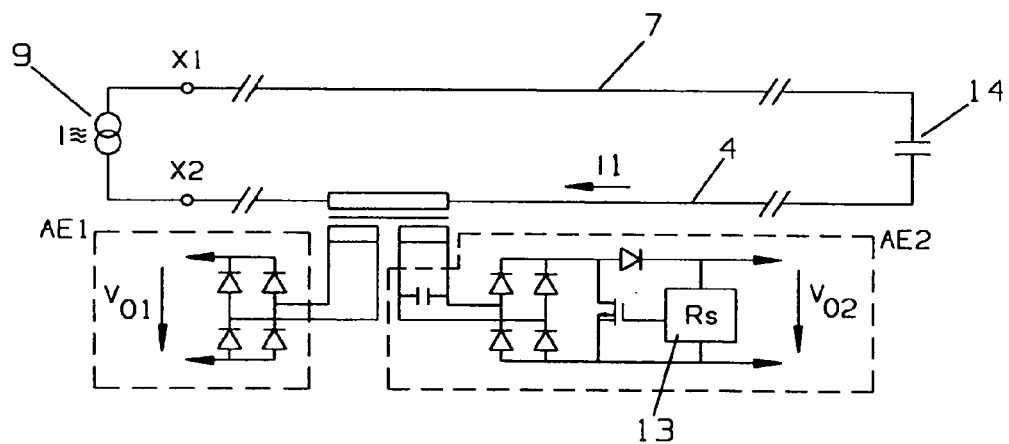
FIG. 6 shows a circuit wiring diagram of a current collector to be provided for the secondary circuit.

The circuit diagram as shown in FIG. 3 represents two current collectors 6-1 and 6-2, each of which is connected to a consumer (not shown), that can be moved along the feeder 4 and require different power levels. A circuit wiring diagram of a current collector 6 that can travel along the feeder 4 and is equipped with the electronic collector circuits AE1 and AE2 as outlined in FIG. 1 for different voltages $V_{O1}$ and $V_{O2}$ is shown in FIG. 6. A control unit ($R_S$) is labeled with reference symbol 13 in the electronic collector circuit AE2 for oscillating circuit quality. There are no feedback effects on the adjacent current collector 6 due to the stabilized power supply. Compensation modules 22 are provided along the guideway formed by the return conductor 7 and the feeder 4 to compensate the inductive voltage portions and thus to increase the working efficiency of the system; these modules are shown as capacitors 22 in FIG. 3.

While the feeder 4 is a finely stranded litz wire with reinforced insulation at mechanically critical points, slide rail 1 is used as return conductor 7. The slide rail segments 1 that are used as return conductor 7 have low-resistance terminations for the required equipotential bonding, while flexible earthing strips (not shown) are provided on all stretching points. By means of specific modulation and demodulation methods, feeder 4 can also be used as a communication channel for programming and remote control of the transfer units.

Communication with the control unit that is connected to the transfer unit T takes place here in the known way using infrared modules that are integrated into the control unit, or radio modules.

Each control unit is routinely equipped with an onboard infrared module that is used for programming and remote control of the propulsion gear of the transfer unit. Furthermore, these mobile infrared modules may communicate with special read-write stations at selected points along the guideway which in turn are managed by the higher-order system control unit. This is where the control units exchange status and command information and store this data in a no-volt protected memory. These IR modules can also be used for start/stop functions and the like, if required.

As an alternative to IR technology, mobile radio modules can be used that can optionally be integrated into the control unit but allow permanent communication with system control. As the range of transmission is limited in a rough industrial environment, an interconnection of fixed base stations is used here, each of these stations representing a cell. These individual cells overlap so that all transfer units on the guideway can be reached safely. This interconnection of radio stations is controlled and monitored in such a way that propulsion gear can be logged off without data loss when the transfer unit leaves a cell and safely logged on to the next cell. This equipment is suitable for rough allotment estimates. If combined with position detection, the user gets a transparent track model of all vehicles and may apply higher-order control mechanisms depending on the communication bandwidth in system control.

The control unit is equipped with the scanner S that carries out position detection along the travel path using mechanical coding 5. This information is also used for internal motor control. Jolts or any other unsteadiness in the absolute code curve can be stored in a no-volt protected memory the control unit, which means there can be greater fault tolerance when installing the absolute code rail 5. This function is most useful when the scanner scans the feeder brackets 2 that carry a mechanical coding 5.

The control unit is designed in such a way that it can either directly actuate a standard gearbox motor with a wheel that is mounted on the drive end and performs both driving and load-bearing functions and an electromechanical brake or a linear motor unit with an electromechanical brake arrangement that functions as a holding brake.

Figure 7:
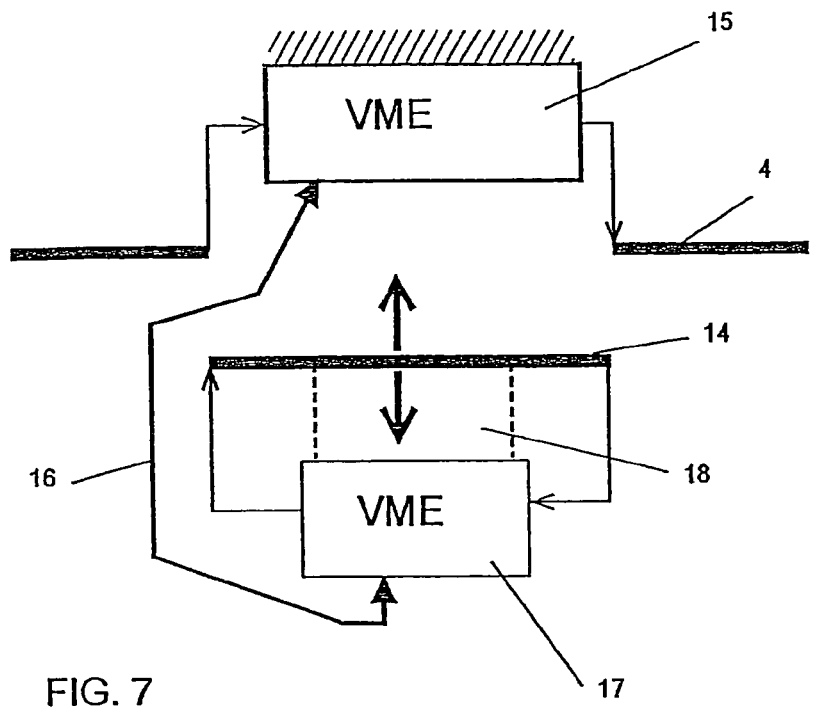
FIG. 7 shows the supply provided for a mobile feeder in the area of a telpher junction.

As shown in FIG. 7, mobile feeders 14 that can be supplied with high-frequency power from a stationary feeder module 15 located in the vicinity of the track and connected to the feeder 14 via a trailing cable and a mobile feeder module 17, are provided in junction areas of the telpher such as points, intersections, lifting, lowering, and shunting stations.

Figure 8:
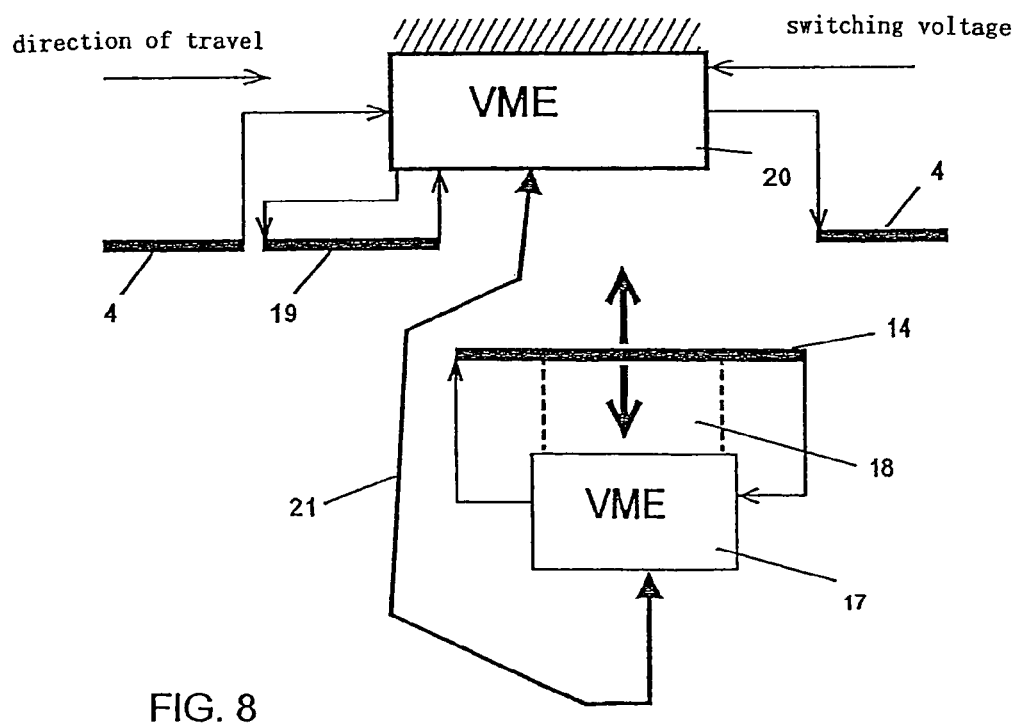
FIG. 8 shows a junction area according to FIG. 7, but comprising an upstream safety block.

As FIG. 8 shows, emergency stops and safety blocks 19 are provided in front of and inside junctions that are connected to permanently installed supply modules 20 in the vicinity of the track to create partial shutdown segments using conventional switching logic. The supply module 20 is configured so that it can be connected to a feeder module 17 via a trailing cable 21.

I claim:

1. An electric telpher with non-contact power transmission from a feeder and return conductor conducted along a slide rail and connected to an AC power supply via a current collector configured as a U-shaped ferrite core with windings that encompasses the supply line to the control and power circuits of a transfer unit that can travel on the slide rail, characterized in that the return conductor is directly formed by the slide rail and that two separate and differently rated windings ($N_{01}$; $N_{02}$) are provided on the current collector formed by the ferrite core that provide different supply voltages ($V_{01}$; $V_{02}$) to the power circuit and control circuit of the transfer unit, respectively.

2. The electric telpher according to claim 1, characterized in that the feeder that consists of high-duty litz wire is held in a feeder bracket that consists of individual linear and short plate-like segments and is mounted to and insulated against the slide rail.

3. The electric telpher according to claim 2, characterized in that the segments of the feeder bracket can be locked into a compact holder attached to the slide rail whose front ends abut or can be fit into one another.

4. The electric telpher according to claim 2, characterized in that the free end of the feeder bracket faces away from the slide rail comprises a holding groove for receiving the feeder.

5. The electric telpher according to claim 2, characterized in that the feeder bracket comprises a mechanical coding in the form of a slotted code rail for detecting the position of the transfer units using a scanner mounted on these transfer units.

6. The electric telpher according to claim 1 characterized in that feeder and return conductor are connected to a three-phase low-voltage system via a six-pulse bridge rectifier that supplies a link voltage ($V_z$) and via a stabilized power supply with PWM rectifier inverter that works on two LC components and an output transformer to feed a constant current of a specific higher frequency into the feeder.

7. The electric telpher according to claim 6, characterized in that the constant current fed into the primary circuit has a medium frequency of $\leq 20$ kHz.

8. The electric telpher according to claim 1, characterized in that the transfer units are programmed and remote controlled using infrared or radio modules that are integrated into their control circuit.

9. The electric telpher according to claim 1, characterized in that the feeder can be used as a communication channel for the programming and remote control of the transfer units by applying specific modulation and demodulation methods.

10. The electric telpher according to claim 1, characterized in that a mobile feeder with a mobile feeder module and attached to a mobile section is provided injunction areas of the telpher, and that this mobile feeder is supplied from a permanently installed feeder module via a trailing cable.

11. The electric telpher according to claim 1, characterized in that emergency stops and safety blocks that are connected to stationary supply modules in the vicinity of the track are provided in front of or inside junctions, and that the supply modules can be connected to a mobile feeder module via a trailing cable.

* * * * *